US012754054B1

(12) United States Patent

Anderssen et al.

(10) Patent No.: US 12,754,054 B1

(45) Date of Patent: Oct. 6, 2026

(54) PET CONSUMABLE CONTAINER AND METHOD OF RE-SUPPLYING PET CONSUMABLES

(71) Applicant: RGENIE, LLC, Ankeny, IA (US)

(72) Inventors: Blake Anderssen, Ankeny, IA (US); Mikaela Sperling, Ankeny, IA (US)

(73) Assignee: Pet Parents, LLC, Ankeny, IA (US)

( * ) Notice: Subject to any disclaimer, the term of this patent is extended or adjusted under 35 U.S.C. 154(b) by 379 days.

(21) Appl. No.: 18/054,573

(22) Filed: Nov. 11, 2022

Related U.S. Application Data

(60) Provisional application No. 63/263,914, filed on Nov. 11, 2021.

(51) Int. Cl.

| | |
|---|---|
| ***G01F 23/20*** | (2006.01) |
| ***G01F 23/80*** | (2022.01) |
| ***G01G 19/414*** | (2006.01) |
| ***G01G 23/37*** | (2006.01) |
| *G01F 23/00* | (2022.01) |
| *G01G 19/40* | (2006.01) |

(Continued)

(52) U.S. Cl.

CPC ............ *G01F 23/20* (2013.01); *G01F 23/802* (2022.01); *G01F 23/804* (2022.01); *G01G 19/4144* (2013.01); *G01G 23/3707* (2013.01); *G01G 23/3735* (2013.01); *G01F 23/0007* (2013.01); *G01F 23/205* (2013.01); *G01G 19/40* (2013.01); *G01G 23/18* (2013.01); *G01G 23/365* (2013.01)

(58) Field of Classification Search

CPC ........... G01G 19/4144; G01G 23/3707; G01G 23/3735; G01G 19/40; G01G 23/18; G01G 23/365; G01F 23/20; G01F 23/802; G01F 23/804; G01F 23/0007; G01F 23/205; G06Q 10/087

See application file for complete search history.

(56) References Cited

U.S. PATENT DOCUMENTS

| | | | |
|---|---|---|---|
| 10,091,972 | B1 | 10/2018 | Jensen et al. |
| 10,275,740 | B2 | 4/2019 | Alvo et al. |

(Continued)

FOREIGN PATENT DOCUMENTS

| | | | |
|---|---|---|---|
| WO | 2000041575 | 7/2000 | |
| WO | WO-2006052034 A1 * | 5/2006 | ......... G01F 23/2967 |

(Continued)

*Primary Examiner* — Benjamin R Schmitt

(74) *Attorney, Agent, or Firm* — Robinson IP Law, PLLC

(57) ABSTRACT

A consumable item container may include a base, a microcontroller located within the base, a reservoir shaped to contain a consumable item therein, a sensor in sensory communication with the reservoir for sensing an amount of a consumable item within the container, and computer-readable instructions executable on the microcontroller for dynamically determining a threshold amount of the consumable item contained in the reservoir by: determining that a consumable item is located in the reservoir of the consumable item container, taking a first measurement of an amount of the consumable, transmitting the amount of the consumable item, taking a second measurement of the amount of the consumable item in the reservoir at a predetermined interval from the first measurement; and transmitting the second measurement of the amount of the consumable item in the reservoir measured with the sensor to the server through the network.

18 Claims, 11 Drawing Sheets

(51) Int. Cl.

| | |
|---|---|
| *G01G 23/18* | (2006.01) |
| *G01G 23/365* | (2006.01) |

(56) References Cited

U.S. PATENT DOCUMENTS

| | | | |
|---|---|---|---|
| 10,586,266 B2 | 3/2020 | Fredrich et al. | |
| 10,719,860 B2 | 7/2020 | Bifolco et al. | |
| 10,769,708 B2 | 9/2020 | Alvo et al. | |
| 10,846,780 B2 | 11/2020 | Lefkow et al. | |
| 10,909,610 B1 | 2/2021 | Kramer et al. | |
| 2014/0278508 A1* | 9/2014 | Akdogan .............. | A61J 7/0481 705/2 |
| 2016/0029592 A1 | 2/2016 | Springer et al. | |
| 2016/0192619 A1 | 7/2016 | Gibbs | |
| 2017/0300984 A1 | 10/2017 | Hurwich | |
| 2018/0032953 A1 | 2/2018 | Mayer et al. | |
| 2019/0171996 A1 | 6/2019 | Hall et al. | |
| 2019/0345019 A1 | 11/2019 | Cheng | |

FOREIGN PATENT DOCUMENTS

| | | |
|---|---|---|
| WO | 2016016599 | 2/2016 |
| WO | 2019156650 | 8/2019 |
| WO | 2019182851 | 9/2019 |
| WO | 2020237020 | 11/2020 |

* cited by examiner

PET CONSUMABLE CONTAINER AND METHOD OF RE-SUPPLYING PET CONSUMABLES

CROSS-REFERENCE TO RELATED APPLICATION

This application claims priority to and is a non-provisional of U.S. provisional patent application Ser. No. 63/263,914 for a “Pet Consumable Container and Method of Re-supplying Pet Consumables” filed on Nov. 11, 2021, the contents of which are incorporated herein by reference in its entirety.

FIELD

This disclosure relates to the field of consumable products specially related to animals, including, for example, pets. More particularly, this disclosure relates to a container and method of reordering animal nonreusable items, or consumables.

BACKGROUND

Owners of animals must frequently purchase animal food, treats, litter, and other nonreusable items. The frequency at which owners must purchase animal consumables may vary depending on the type of animal size, breed, feeding habits, recommended products/amount, type of consumable, and other characteristics of the animal and their needs. Although the frequency may vary, owners of animals must regularly re-stock these consumable items, such as by purchasing additional quantities of such items. Many owners of animals may re-supply animal consumables by ordering online. However, it may be difficult to predict when ordering of such items should occur to ensure that a supply remains available for the animal use or intake. Animal owners may attempt to stock up on various consumable items, such as by purchasing more of a consumable item than is needed. However, this requires additional storage space and further may result in certain consumable products expiring before being consumed.

Some attempts have been made to provide for a continuous supply of animal consumables, specifically food for animal owners. For example, pet owners may sign up for regular shipments of pet food. Those shipments may be sent at pre-determined time intervals, such as monthly or bi-monthly. However, existing methods may result in the pet owner either running out of food before a new shipment arrives or result in the pet owner having excess quantities of pet food on hand. Such methods do not take into account the pet’s actual consumption of pet food or consider when pet food should be re-supplied based on the specific characteristics of the pet.

Technical problems also exist with respect to the ability to accurately measure an amount of a consumable product, such as pet food, within a container using a sensor on the container. For example, technical problems may exist in measuring an amount of product in a container and being able to accurately measure an amount of time before that item is depleted from the container. Other technical problems exist related to the fulfillment of an item based on measurements from sensors, such as load cell sensors, and accurately determining fulfillment or replenishment of an item based on measurements by those sensors.

What is needed, therefore, a container for tracking the amount of consumables that have been consumed by or due to an animal use and for re-ordering the consumables at a desired time to ensure that the supply is not depleted or have an overabundance, both of which are inconvenient and inefficient.

SUMMARY

In some aspects, the techniques described herein relate to a consumable item container including: a base; a microcontroller located within the base; a reservoir shaped to contain a consumable item therein; a sensor in sensory communication with the reservoir for sensing an amount of a consumable item within the container, the sensor in electronic communication with the microcontroller; computer-readable instructions executable on the microcontroller for dynamically determining a threshold amount of the consumable item contained in the reservoir by: determining with the microcontroller that a consumable item is located in the reservoir of the consumable item container; taking a first measurement of an amount of the consumable item in the reservoir with the sensor in response to determining that a consumable item is located in the reservoir; transmitting the amount of the consumable item in the reservoir measured with the sensor to a server through a network; taking a second measurement of the amount of the consumable item in the reservoir with the sensor, the second measurement taken at a predetermined interval from the first measurement; and transmitting the second measurement of the amount of the consumable item in the reservoir measured with the sensor to the server through the network.

In some aspects, the techniques described herein relate to a consumable item container, wherein the sensor includes a load cell for measuring a weight of the consumable item in the container.

In some aspects, the techniques described herein relate to a consumable item container, wherein the reservoir is formed having one or more transparent side walls.

In some aspects, the techniques described herein relate to a consumable item container, the computer-readable instructions on the microcontroller further: storing a threshold value corresponding to a threshold amount of the consumable item on computer-readable storage on the consumable item container; receiving an updated threshold value from the server; wherein the updated threshold value is based on the first measurement of the amount of the consumable item in the reservoir and the second measurement of the amount of the consumable item in the reservoir taken at the predetermined interval from the first measurement.

In some aspects, the techniques described herein relate to a consumable item container, wherein the updated threshold value is further based on fulfillment data for the consumable item retrieved by the server.

In some aspects, the techniques described herein relate to a method of dynamically adjusting a threshold of a consumable item within a container, the method including: receiving, on a server, a first measurement of an amount of a consumable item in a reservoir of a consumable item container from a sensor in sensory contact with the reservoir; storing the first measurement of the amount of a consumable item in the reservoir; receiving, on the server, a second measurement of the amount of the consumable item in the reservoir of the consumable item container from the sensor in sensory contact with the reservoir; generate a threshold amount of the consumable item based on the received first measurement and the received second measurement of the amount of the consumable item in the reservoir; receive a third measurement of the amount of the consumable item in the reservoir of the consumable item container from the sensor in sensory contact with the reservoir; and adjust the threshold amount of the consumable item based on the received third measurement of the amount of the consumable item in the reservoir.

In some aspects, the techniques described herein relate to a method of dynamically adjusting a threshold of a consumable item within a container, the method further including: receiving, on the server, data identifying a type of product being consumed from the reservoir of the consumable item container; retrieving data corresponding to a fulfillment time of the type of product being consumed from the reservoir of the consumable item container; adjusting the threshold amount of the consumable item based on the retrieved data corresponding to the fulfillment time of the type of product being consumed from the reservoir of the consumable item container.

In some aspects, the techniques described herein relate to a method of dynamically adjusting a threshold of a consumable item within a container, the data corresponding to the fulfillment time of the type of product being consumed from the reservoir of the consumable item container including data corresponding to a shipping time to a location of the consumable item container, data corresponding to an average daily fulfillment rate, calendar data identifying any holidays or non-shipping days, and an inventory level of the type of product being consumed from the reservoir of the consumable item container.

In some aspects, the techniques described herein relate to a method of dynamically adjusting a threshold of a consumable item within a container, the method further including: retrieving the data corresponding to the fulfillment time of the type of product in response to receiving each of the first, second, and third measurements of the amount of the consumable item in a reservoir of the consumable item container.

In some aspects, the techniques described herein relate to a method of dynamically adjusting a threshold of a consumable item within a container, the method further including: adjusting the threshold amount of the consumable item in response to receiving each of the first, second, and third measurements of the amount of the consumable item in a reservoir of the consumable item container.

In some aspects, the techniques described herein relate to a method of dynamically adjusting a threshold of a consumable item within a container, the data corresponding to a fulfillment time of the type of product being consumed from the reservoir of the consumable item container further including a fulfillment buffer time.

In some aspects, the techniques described herein relate to a method of dynamically adjusting a threshold of a consumable item within a container, the method further including: determining with a processor of the server that an amount of the consumable item within the reservoir of the container is at or below the threshold amount; in response to determining that an amount of the consumable item within the reservoir of the container is at or below the threshold amount, transmit an order for fulfillment of the consumable item to the location of the container.

In some aspects, the techniques described herein relate to a method of dynamically adjusting a threshold of a consumable item within a container, the method further including: transmitting a notice to a user device that an order for fulfillment of the consumable item has been placed.

In some aspects, the techniques described herein relate to a method of dynamically adjusting a threshold of a consumable item within a container, the method including: receiving, on a server, a first measurement of an amount of a consumable item in a reservoir of a consumable item container from a sensor in sensory contact with the reservoir; storing the first measurement of the amount of a consumable item in the reservoir; receiving, on the server, data identifying a type of product being consumed from the reservoir of the consumable item container; receiving, on the server, a second measurement of the amount of the consumable item in the reservoir of the consumable item container from the sensor in sensory contact with the reservoir; generate a threshold amount of the consumable item based on the received first measurement and the received second measurement of the amount of the consumable item in the reservoir; receive a third measurement of the amount of the consumable item in the reservoir of the consumable item container from the sensor in sensory contact with the reservoir; and adjust the threshold amount of the consumable item based on the received third measurement of the amount of the consumable item in the reservoir; retrieving data corresponding to a fulfillment time of the type of product being consumed from the reservoir of the consumable item container; adjusting the threshold amount of the consumable item based on the retrieved data corresponding to the fulfillment time of the type of product being consumed from the reservoir of the consumable item container.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
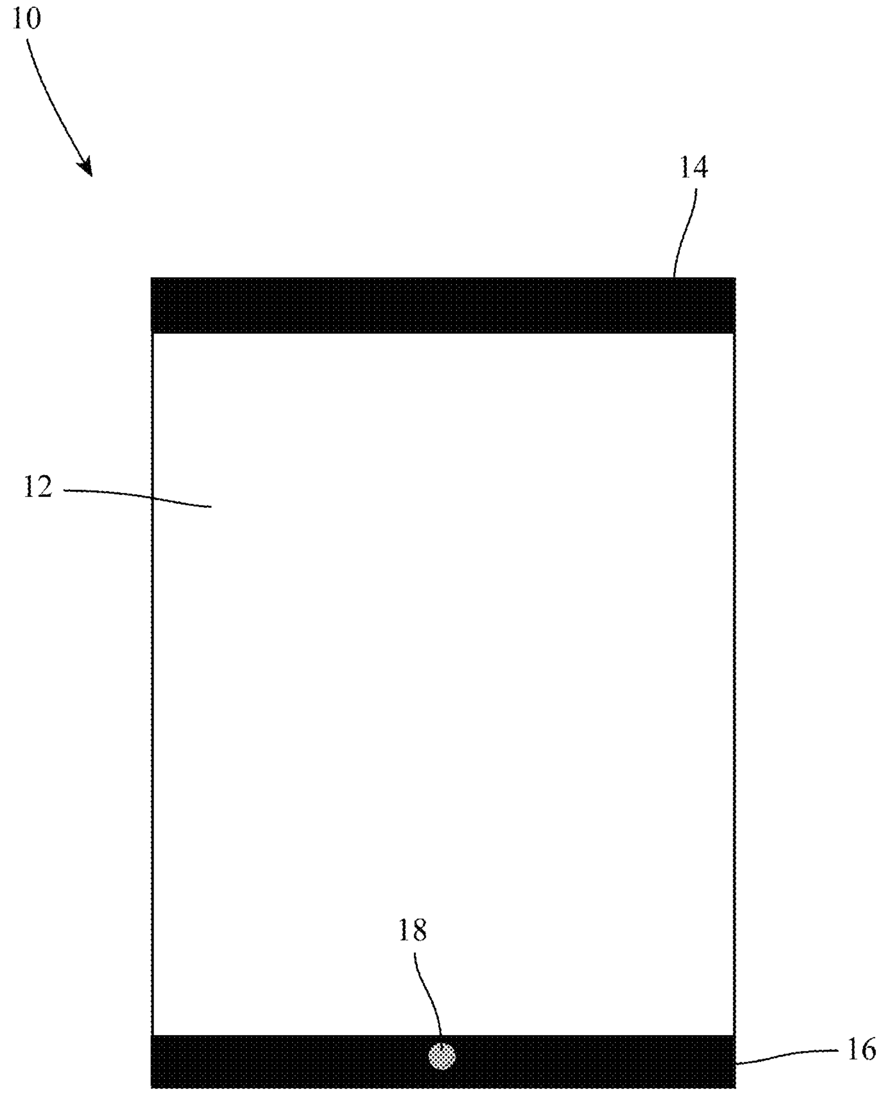
FIG. 1 shows a container according to one embodiment of the present disclosure.

FIG. 1 shows an embodiment of a container 10. The container 10 is adapted to hold consumable products in relation to animals within the container 10. The container 10 is adapted to determine a rate of consumption of animals' consumable products, such as pet food, held within the container 10. The reorder action of the product within the container 10 is dynamically determined based on a number of factors related to the product, consumption rate, and availability of additional amounts of said consumable product to be shipped to a consumer. Additional product is ordered when the reorder action is reached to ensure that product, such as pet food, is available for a pet before the consumable product is depleted from the container 10. Although reference is made below to a consumable product being pet food, it is also understood that the container 10 may store other various consumable animal products such as treats, litter, supplements, chews, and other products that are not reusable.

The container 10 includes a reservoir 12 for containing consumables related to animals. The reservoir 12 preferably includes transparent walls formed of a polymer such as BPA free clear polyethylene terephthalate (PET). However, it is also understood that the reservoir 12 may be formed of other suitable materials, such as metal, glass, or other polymers. The reservoir 12 may be sealed, such as by including a lid 14 located on top of the reservoir 12. The lid 14 is removable such that additional consumable product may be added to the reservoir 12. The lid 14 may similarly be formed of a polymer, high density polyethylene (HDPE) or other suitable materials. The lid 14 is formed, such as with HDPE, to create an airtight seal of the reservoir to maintain freshness of the product within and reduce the risk of contamination to contained product. The lid 14 may include an airtight seal to preserve any expirable consumable for a longer period of time. The reservoir 12 is located above a base 16 of the container 10. The base 16 is located below the reservoir 12 but above a surface on which the container 10 is located. The base 16 may include one or more user inputs 18 located thereon, such as a power button. The base 16 is adapted to hold various components of the container 10, as described in greater detail below. Although various components of the container 10 are described as being formed of a polymer, it is also understood that the container 10 may be formed of various other suitable materials.

Figure 2:
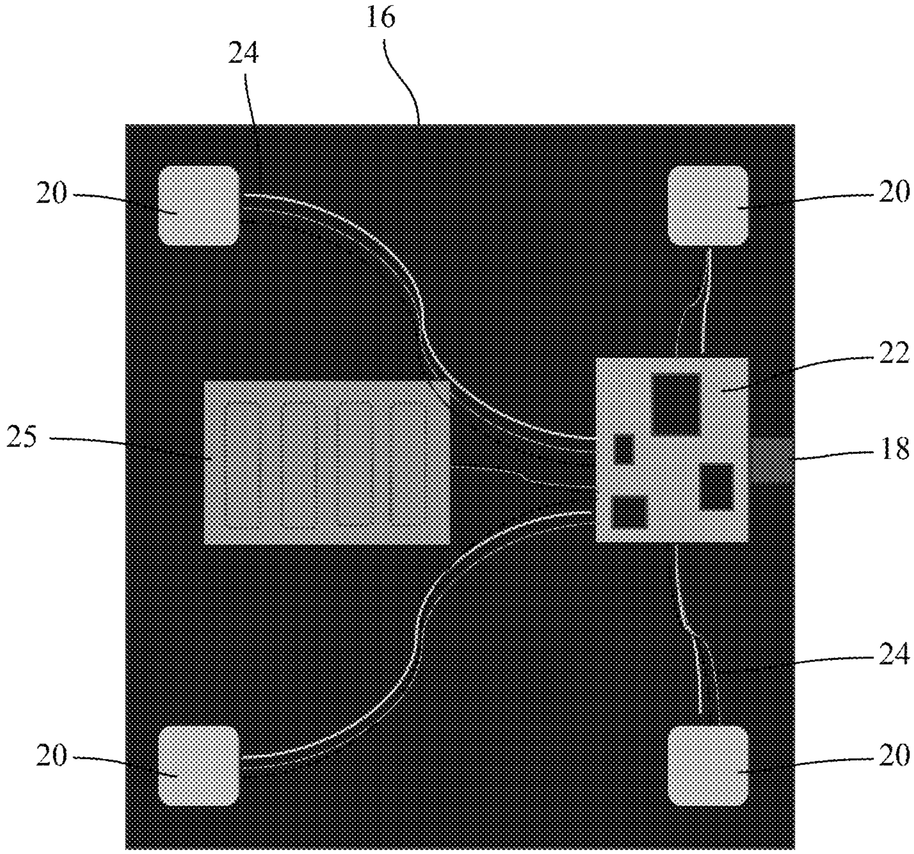
FIG. 2 shows a schematic view of components of a container according to one embodiment of the present disclosure.

Referring now to FIG. 2, the container 10 includes various hardware components for determining an amount of consumable product within the reservoir 12 of the container 10 to determine a rate of consumption of the consumable product such as but not limited to, pet food, from the container 10. The container 10 includes one or more sensors 20 for detecting an amount of consumable product such as but not limited to, pet food, within the container 10. The one or more sensors 20 may be, for example, one or more load cells for detecting changes to weight of an amount of consumable product located within the reservoir 12 of the container 10. The one or more sensors 20 may be arranged across the base 16 of the container 10. When the one or more sensors 20 are load cells or other weight sensing elements, the one or more sensors 20 are located between the reservoir 12 and a surface on which the container 10 is located such that the one or more sensors 20 may detect a weight of the container 10 and further detect changes to a weight of the container 10, such as when pet food may be the consumable and it is removed from the reservoir 12 for feeding of a pet, periodically throughout a specified time period, or manually request from the application that connects to the device.

The one or more sensors 20 are in electronic communication with a controller 22. The controller 22 may be located within the base 16. The one or more sensors 20 may be in communication with the controller 22 through one or more wires 24 extending between the one or more sensors 20 and the controller 22. The container 10 may further include an onboard power source 25, such as one or more batteries located within the base 16 or a source to charge the container.

Figure 3:
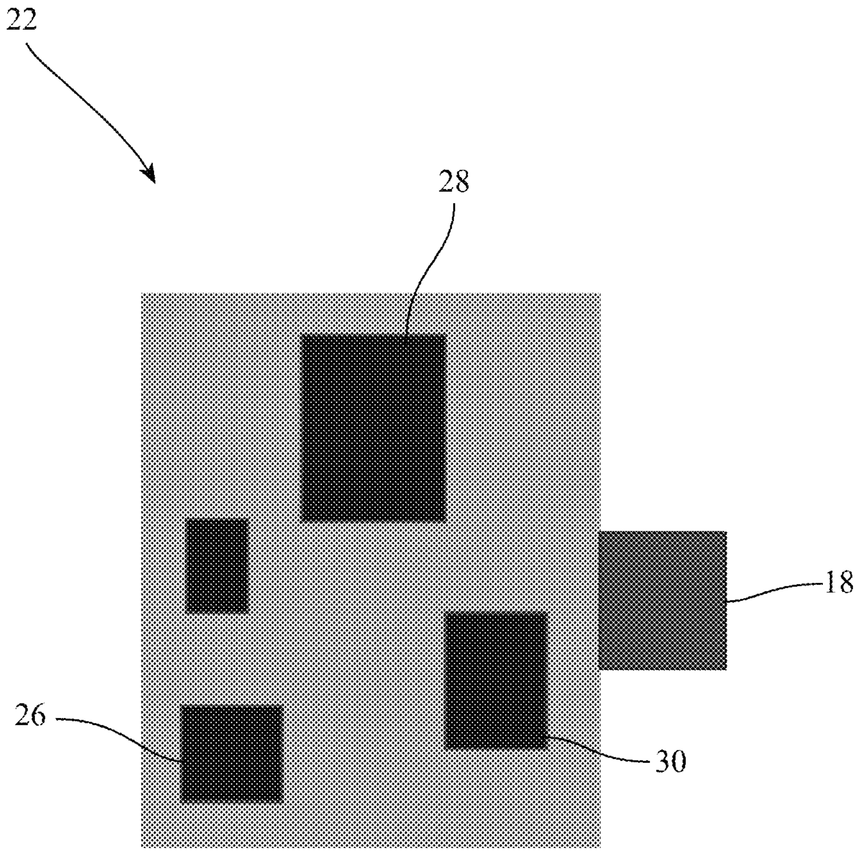
FIG. 3 shows a schematic view of a controller of a container according to one embodiment of the present disclosure.

Referring to FIG. 3, the controller 22 is configured to receive data from the one or more sensors 20, such as one or more load cells or other weight sensing elements and transmit data from the container 10 to a remote server as discussed in greater detail below. Elements of the controller 22 may include, for example, a microcontroller 26 for communicating with the one or more sensors 20. The sensor microcontroller 26 may receive data from the one or more sensors 20 and otherwise control the one or more sensors 20. The controller 22 may further include a communications microcontroller 28 for controlling communication of the container 10 with a remote server discussed below. The communications microcontroller 28 may include various communications components for communicating with a server, such as for communicating over WiFi or Bluetooth protocols. The controller 22 may further include other various microcontroller elements, such as a power microcontroller 30.

Figure 4:
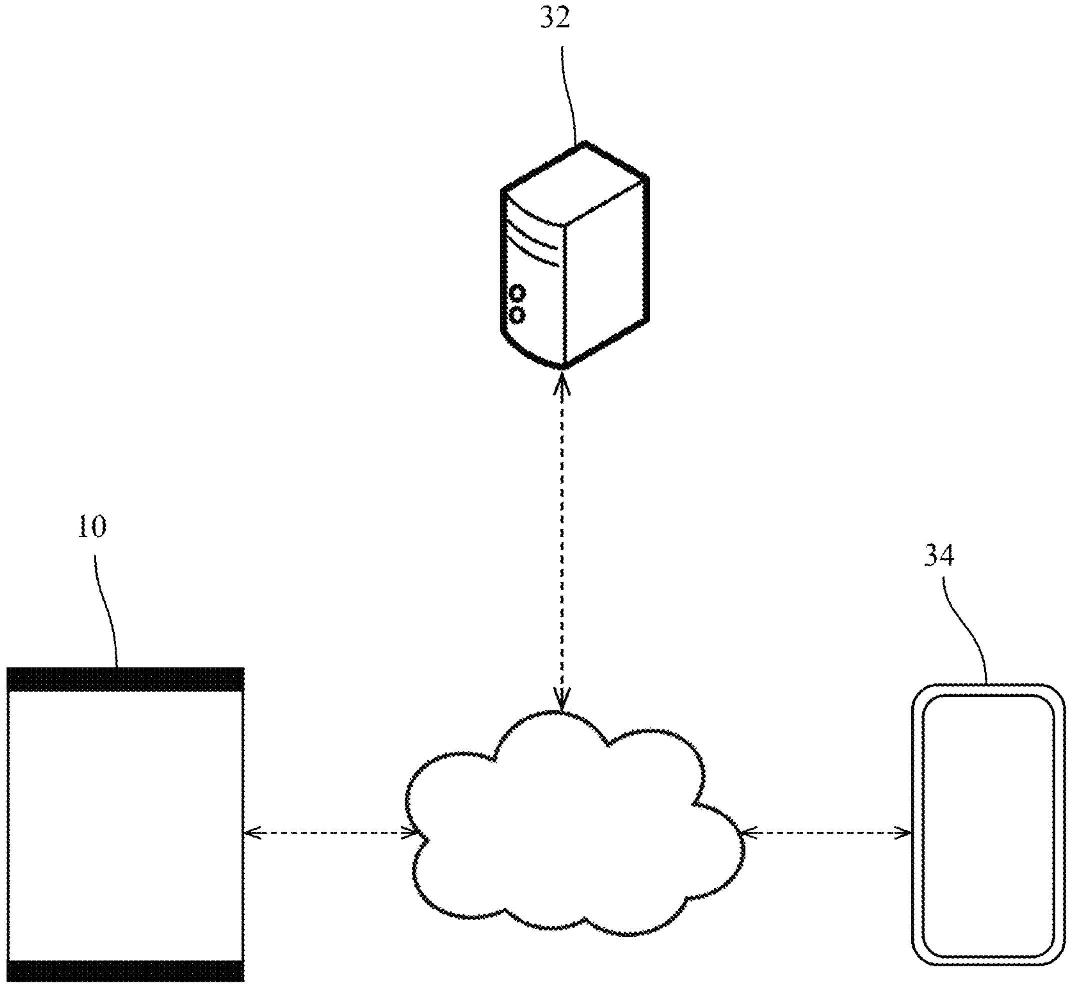
FIG. 4 shows a system for re-ordering consumables according to one embodiment of the present disclosure.

As shown in FIG. 4, the container 10 may communicate wirelessly with a server 32 and a user device 34, such as over a network. The user device 34 may be a smart phone, tablet, personal computer, or other computing device. The user device 34 may communicate with the container 10 over a network or over various suitable wireless protocols, such as WiFi or Bluetooth. The user device 34 may communicate with the controller 22 of the container 10 to initially set up and otherwise control settings of the container 10. The user device 34 and the container 10 may communicate with the server 32, such as for reordering of product for a user. The server 32 may include a database storing data related to a plurality of user accounts, containers, and other information, such as data corresponding to various types of the consumable products and availability of such consumable products.

The container 10 may establish wireless communication with the server 32, such as through use of the user device 34. For example, when the container 10 communicates via Bluetooth, the container 10 may first establish a wireless connection with the user device 34 and subsequently communicate with the server 32 via the user device 34. In another example, when the container 10 communicates via WiFi, the container 10 may first communicate with the server 32 and then subsequently communicate with the user device 34 over the WiFi connection.

The server 32 may include a computer readable medium for executing instructions and algorithms as disclosed herein. Instructions operable on the server may be configured to receive data from the container 10, such as from the one or more sensors 20, and execute a re-order of a consumable product. The container 10 may be in wireless communication with the server 32. In one embodiment, the server 32 is cloud-based and may include a cloud database for storage of data from the container 10.

Figure 5:
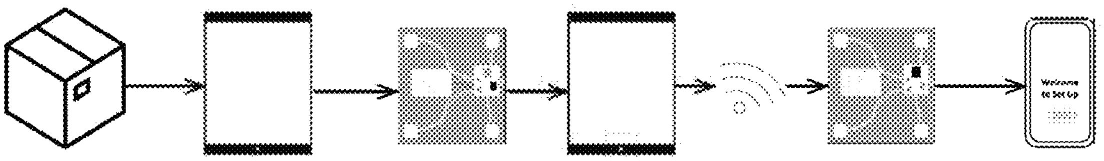
FIG. 5 shows a process of setting up a container according to one embodiment of the present disclosure.

Referring to FIG. 5, the container 10 may be initially set up using the user device 34. As shown in FIG. 5, a source of power must first be given to the container 10, such as installing batteries. The user device 34 communicates with the container to initially set up the container and preferences of the user. For example, a user may create a user account using the user device 34. The user may input preferences of the user, such as information corresponding to animals owned by the user. Information may include type of animal, breed, size or weight of the animal, preferred food or other consumable products, and other information of the user and the user's animal. Information entered by the user may be stored, such as on the server 32.

Figure 6:
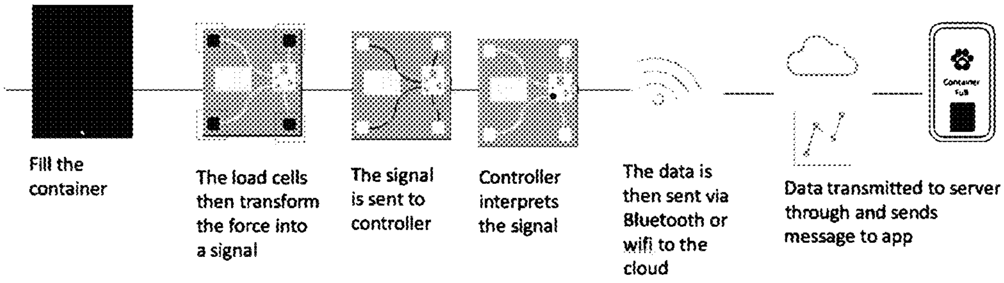
FIG. 6 shows a process of filling a container according to one embodiment of the present disclosure.

FIG. 6 illustrates the container 10 having been filled with an example of an animal consumable product, food. When the container 10 is filled with a consumable, the one or more sensors 20 (illustrated as load cells) detect a weight of the food in the container 10. The one or more sensors 20 send signals to the controller 22, which interprets the signals and determines a weight of the example product, food, in the container 10. Data corresponding to the detected weight of the food is periodically transmitted to the server 32 (FIG. 4). When the container 10 is full or at a desired fill level of the consumable, a message may be transmitted to the user device 34 indicating that the container 10 is full.

Figure 7:
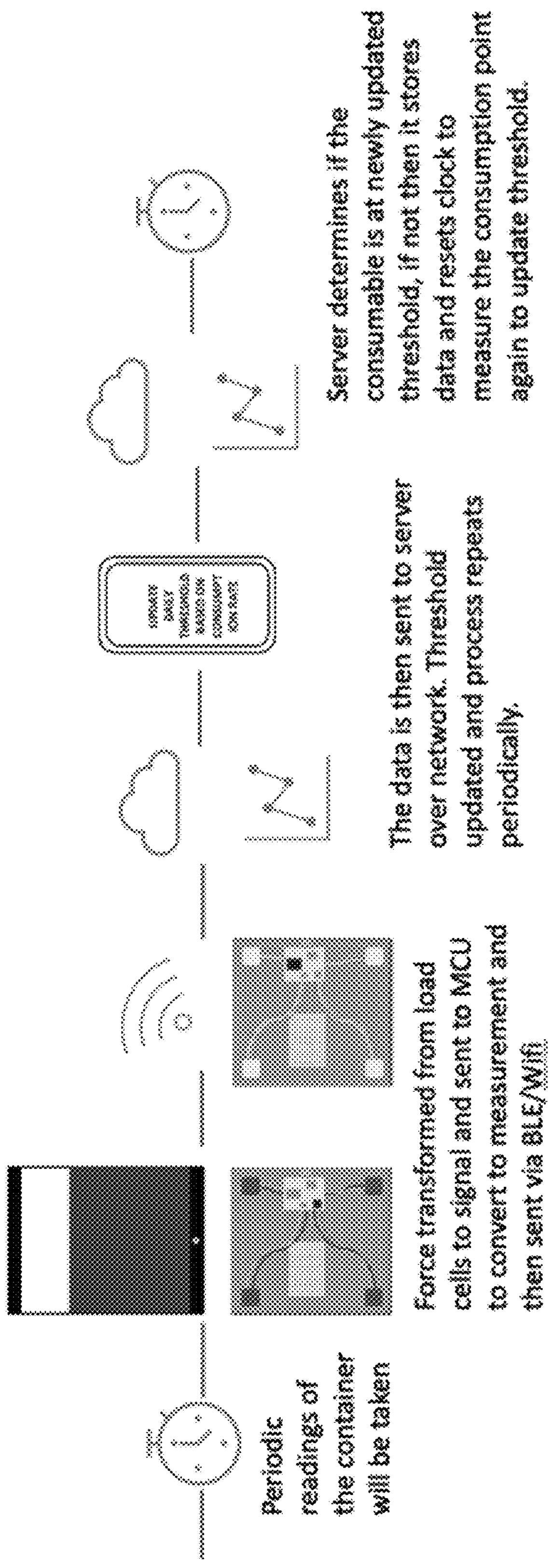
FIG. 7 shows a process of measuring an amount of consumables in a container according to one embodiment of the present disclosure.

As shown in FIG. 7, a product, such as food, is consumed, a level of food within the container 10 is reduced. Periodic measurements from the one or more sensors 20 are taken to determine a level of food in the container 10. Data corresponding to the amount of the example product, food, in the container 10 is transmitted to the server 32 over a network. A rate of consumption of the pet food from the container 10 is determined based on periodic detection of changes to an amount of the food in the container 10 by the one or more sensors 20. The reorder action may be determined and then continuously and/or dynamically adjusted based on detected changes to the amount of a consumable product such as, food, in the container 10. The amount of consumable product in the container 10 is periodically evaluated relative to the changing reorder action trigger amount of the example product, food. If an amount of consumable product in the container 10 exceeds the minimum reorder action trigger or a threshold value, data corresponding to the amount of consumable product is stored and an amount of the consumable product is subsequently checked at a later time to again evaluate relative to the reorder action trigger and update the trigger amount or threshold value of consumable product within the container 10 based on the consumption of that period of time and any other related updates such as availability of the product which is updated from the connected server information. Other types of measurement that container 10 preferably embodies would be a user setting when clicked to update the user on how much is left in container 10 at that time, a back-end setting for manual checking that sends signal to get measurement and/or a measurement that has a delayed trigger once the user has opened container 10 to remove some amount of the remaining consumables within container 10 for use in relation to the animal.

Figure 8:
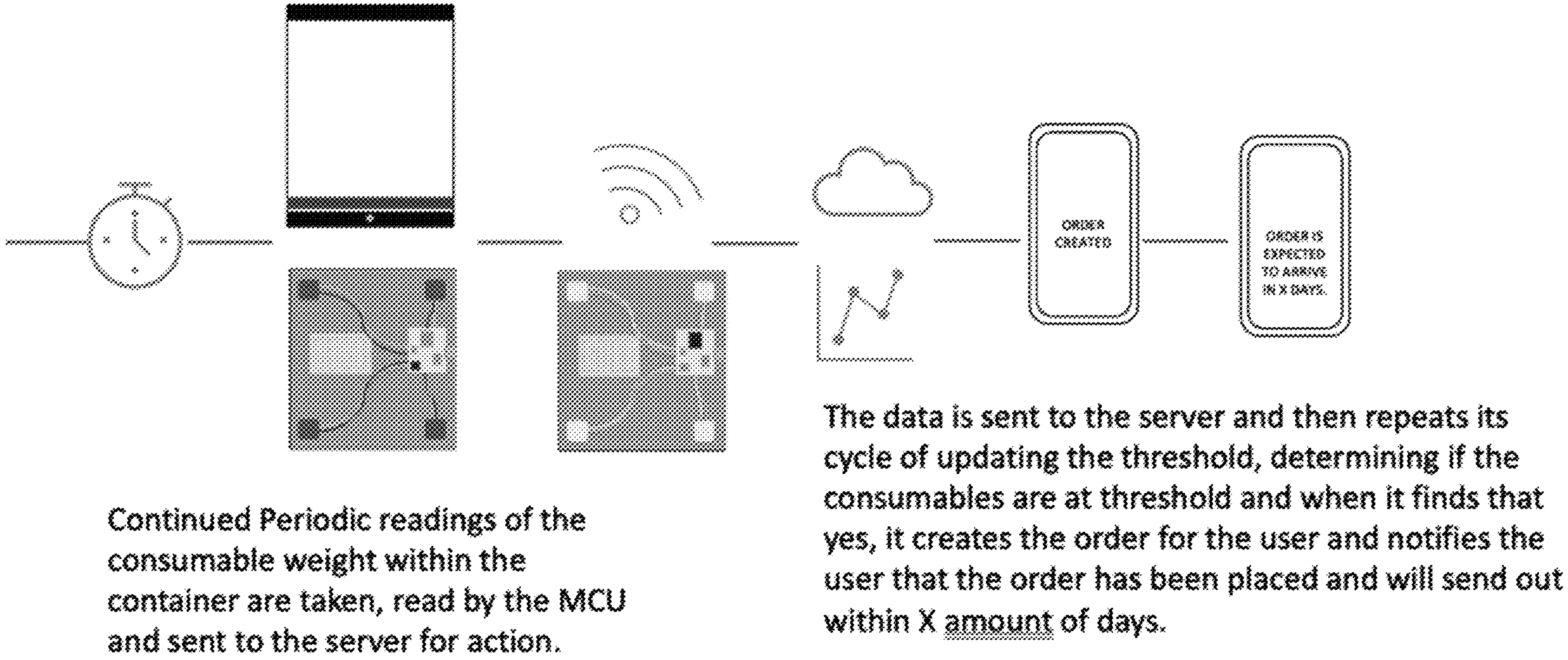
FIG. 8 shows a process of periodically determining an amount of consumables in a container according to one embodiment of the present disclosure.

Referring now to FIG. 8, when an amount of an example product, food, in the container 10 is determined to be at or below the calculated trigger amount of example product, food, an order is generated for additional food to be shipped to the user. When an amount of a consumable product is below the reorder action trigger amount that is calculated according to embodiments described herein, an order is placed through the server 32 for additional amounts of the consumable product to be shipped to the user. The user may receive one or more notifications on the user device 34, notifying the user that an order has been place and of an estimated amount of time until the re-ordered product arrives.

Figure 10:
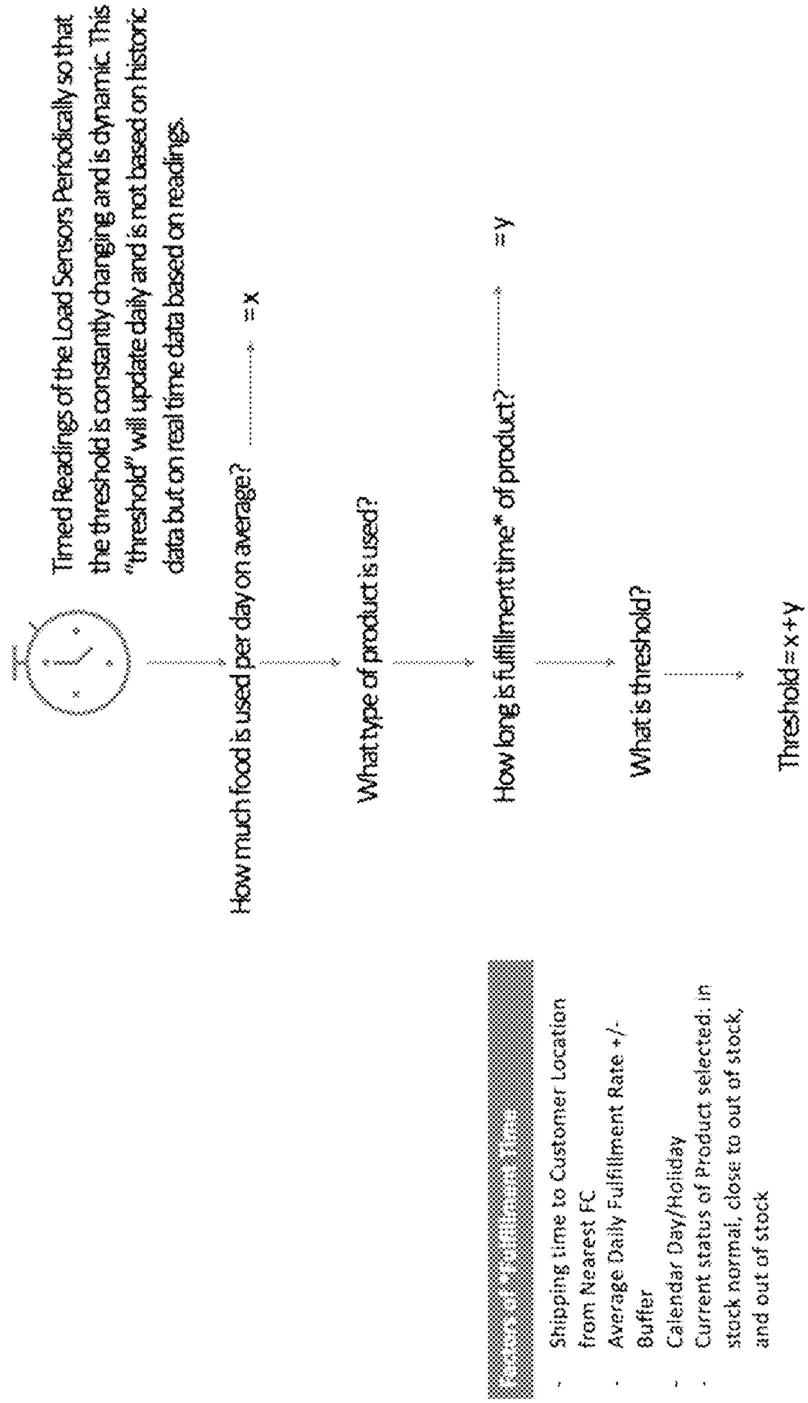
FIG. 10 shows a process of determining the action for re-ordering consumables according to one embodiment of the present disclosure.

Aspects further include determining the reorder action trigger amount of a consumable product, such as food, in the container. Determining the trigger amount may occur dynamically and may be based on a number of factors that are regularly updated to determine when a re-order of the consumable product should be made. Referring to FIG. 10, the reorder action trigger may be determined based on data including how much product is being consumed per day (or other periodic interval), what type of product is being consumed by the animal, and an estimated fulfillment time for the particular product to be re-ordered to prevent potential stock out or over ordering of product. To determine an estimated fulfillment time, data that may be considered includes information related to the shipping time to the customer's location or the location of the container 10 from a nearest fulfillment center (+/−a buffer), average daily fulfillment rate (+/−a buffer), whether a fulfillment time includes any holidays, weekends, or any other potential delay, a current status of the product to be re-ordered and other relatable factors that affect the estimated fulfillment time.

Figure 9:
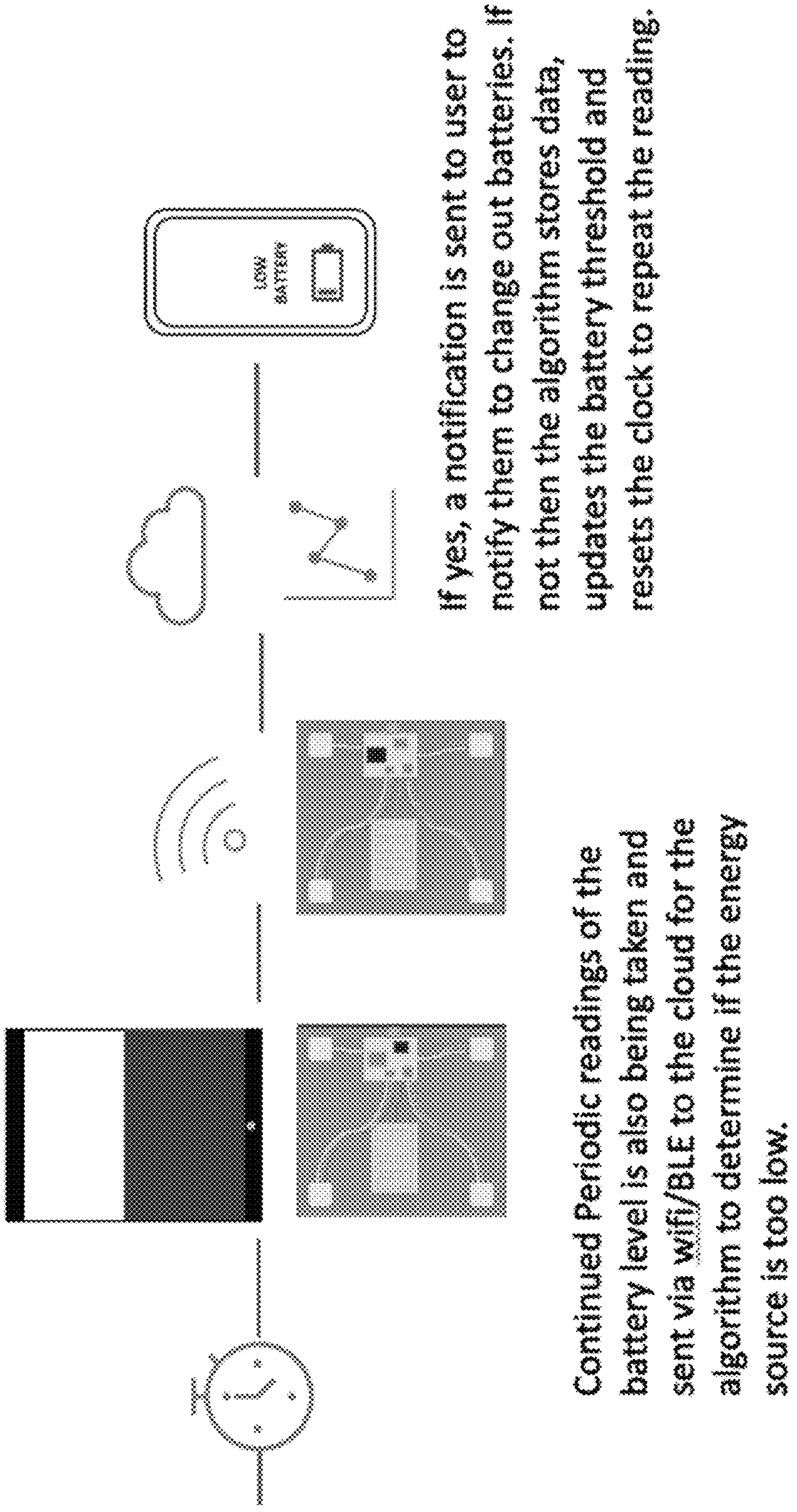
FIG. 9 shows a process of determining a battery level of a container according to one embodiment of the present disclosure.
Figure 12:
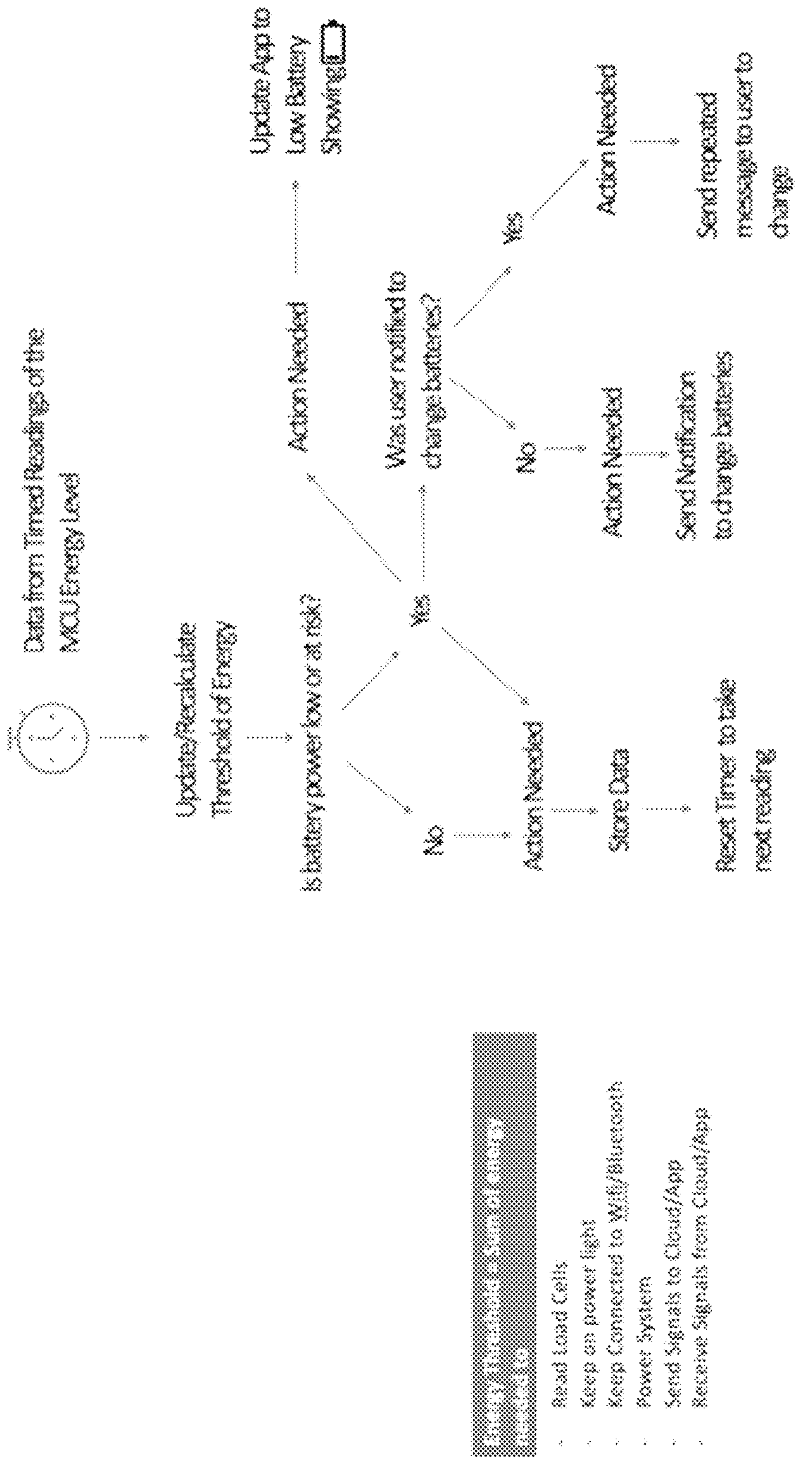
FIG. 12 shows a process of determining whether to send a low battery notification according to one embodiment of the present disclosure.

Embodiments of the container 10 may further include detecting whether the container 10 has a low battery. For example, as shown in FIG. 9, period readings of a battery level of the container 10 may be taken and transmitted to the server 32 to analysis. If a battery level of the container 10 is below a designated amount, a notification may be transmitted to the user device 34, notifying the user to change one or more batteries of the container 10. If a battery level is not below a designated amount, a battery level of the container is stored potentially in the data storage server or cloud. A battery trigger level may be updated, and the level of a battery of the container 10 is subsequently checked with respect to the trigger level. FIG. 12 schematically illustrates logic of the server for receiving data related to a battery level of the container 10 and transmitting a notice to the user should a low battery be detected.

Figure 11:
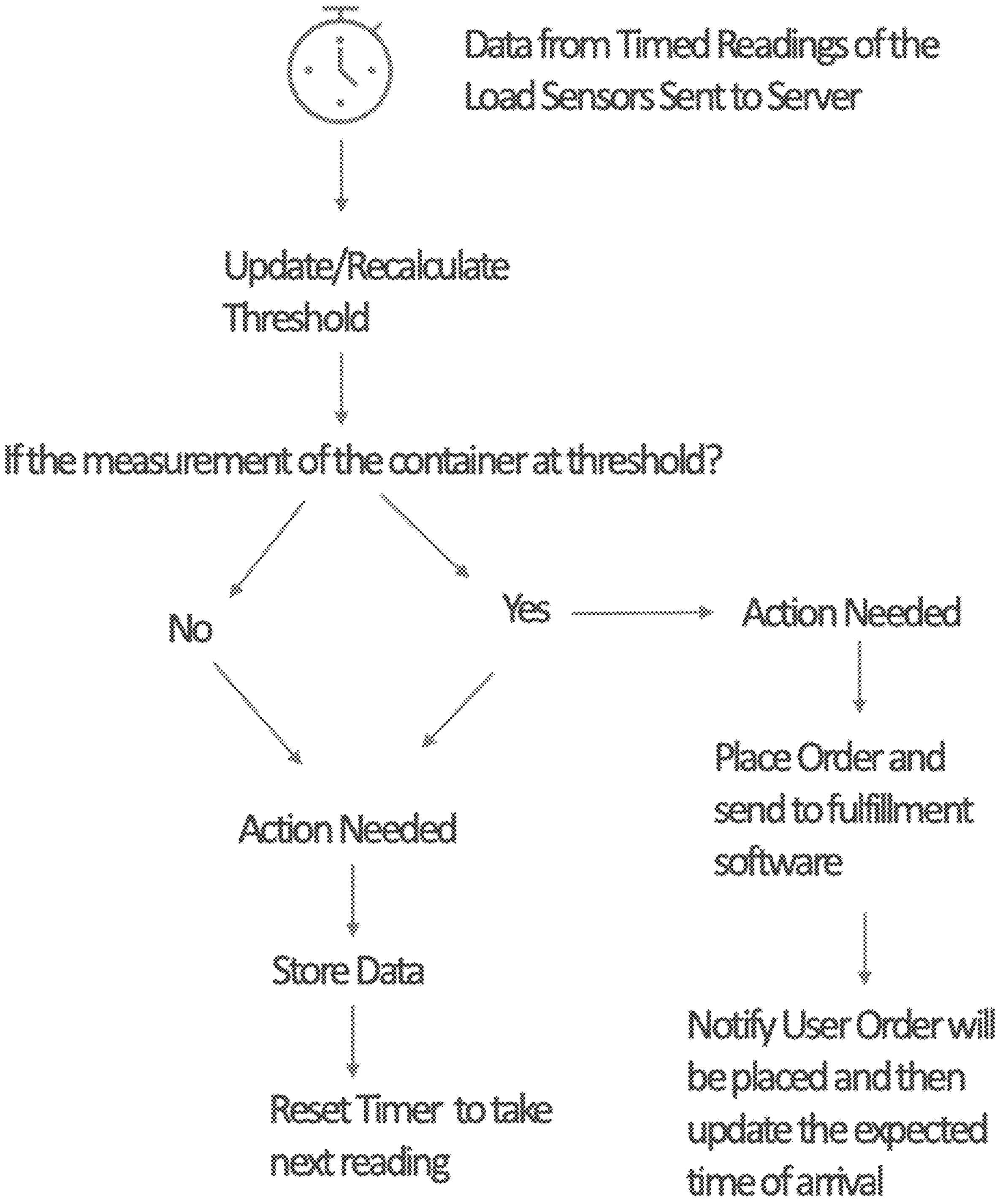
FIG. 11 shows a process of determining whether to re-order consumables for the container according to one embodiment of the present disclosure.

Data corresponding to this information may be continuously and dynamically received on the server 32. The trigger value may be continuously updated as a consumable product from the container 10 is consumed and based on data received on the server 32 corresponding to fulfillment time and other factors affecting availability of a consumable product to be provided to the user to refill the container 10. As shown in FIG. 11, timed readings may be taken on the container 10 at a periodic interval. After the trigger is determined based on the most current data from the container and server, it is determined whether an amount of consumable product in the container 10 is at or below the reorder action trigger level. If not, data corresponding to an amount of consumable product in the container 10 is stored and is reset until the next interval to receive data from the container to dynamically determine whether a re-order of the consumable is to be placed. If an amount of consumable product is at or below the trigger level, an order is placed through the server 32 and the user is notified of a re-order having been placed. The re-order may occur automatically without requiring any input from the user but is not based on time and only based on the dynamic trigger level.

To trigger a reorder action of the consumable, data including the fulfillment time, consumption rate, and remaining stock of the consumable are known. Fulfillment time may be determined by taking into account how long a particular consumable will take to reach the user (such as shipping time, etc.). A consumption rate is determined as disclosed herein where measurements from the start of the remaining stock of the consumable from a start of the measurement time period is taken to a measurement of stock of the consumable at the end of the measurement time period. A re-order of the consumable is triggered when a remaining amount of the consumable is less than or equal to a determined fulfillment time when factored with other dynamic variables disclosed herein. A remaining amount of consumable determination takes into account a determination of remaining stock being no more or less than a designated amount, of predetermined amount of time, such that the user will never have a large excess amount of stock of the consumable or be without the consumable for an amount of time that is needed.

Embodiments herein advantageously enable an accurate and efficient re-order by the systems and methods disclosed herein of a consumable product, such as food, when additional product is necessary with little to no input from the user. Further, changes to the consumption rate of the product held within the container, for example a change in animal feeding habits, may be accounted for based on dynamic adjustment of the trigger level for re-ordering the consumable product. Additional adjustments may be made based on estimated fulfillment times for re-ordering a particular type of product, thereby ensuring that a user does not run out of the consumable product. These adjustments ensure that the user is not responsible for reordering at a level that is not consistent to their consumption and product needs, such that there is not an excess amount nor a deficit in terms of the consumable good.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A consumable item container comprising:
- a base;
- a microcontroller located within the base;
- a reservoir shaped to contain a consumable item therein;
- a sensor in sensory communication with the reservoir for sensing an amount of a consumable item within the container, the sensor in electronic communication with the microcontroller;
- computer-readable instructions executable on the microcontroller for dynamically determining a threshold amount of the consumable item contained in the reservoir by:
  - determining with the microcontroller that a consumable item is located in the reservoir of the consumable item container;
  - taking a first measurement of an amount of the consumable item in the reservoir with the sensor in response to determining that a consumable item is located in the reservoir;
  - transmitting the amount of the consumable item in the reservoir measured with the sensor to a server through a network;
  - taking a second measurement of the amount of the consumable item in the reservoir with the sensor, the second measurement taken at a predetermined interval from the first measurement;
  - transmitting the second measurement of the amount of the consumable item in the reservoir measured with the sensor to the server through the network;
  - determining an estimated fulfillment time for the consumable item based on shipping time to a location of the container and average daily fulfillment rate; and
  - calculating the threshold amount based on the estimated fulfillment time and a consumption rate determined from the first measurement and the second measurement;
  - continuously updating the threshold amount based on data received on the server corresponding to fulfillment time and availability of the consumable item;
  - periodically evaluating with the sensor an amount of the consumable product in the reservoir relative to the continuously updated threshold amount; and
  - updating the threshold amount based on consumption during each evaluation period and availability of the product from the server.

2. The consumable item container of claim 1, wherein the sensor comprises a load cell for measuring a weight of the consumable item in the container.

3. The consumable item container of claim 1, wherein the reservoir is formed having a transparent portion selected from one of a transparent wall or window.

4. The consumable item container of claim 1, the computer-readable instructions on the microcontroller further:
- storing a threshold value corresponding to the threshold amount of the consumable item on computer-readable storage on the consumable item container;
- receiving an updated threshold value from the server;
- wherein the updated threshold value is based on the first measurement of the amount of the consumable item in the reservoir and the second measurement of the amount of the consumable item in the reservoir taken at the predetermined interval from the first measurement.

5. The consumable item container of claim 1, wherein the computer-readable instructions dynamically determine the threshold amount of the consumable item contained in the reservoir by further:
- calculating a consumption rate based on the first measurement and the second measurement; and
- receiving from the server an updated threshold amount based on the calculated consumption rate.

6. The consumable item container of claim 5, wherein the threshold amount is dynamically adjusted to prevent depletion and overstock of the consumable item.

7. The consumable item container of claim 1, wherein determining an estimated fulfillment time for the consumable item is further based on potential shipping delays.

8. The consumable item container of claim 1, further comprising a lid, wherein the lid includes a seal configured to form an airtight seal when the lid is coupled to an opening in the reservoir.

9. The consumable item container of claim 1, wherein the computer-readable instructions further dynamically determine the threshold amount of the consumable item contained in the reservoir by:

receiving from the server data identifying a type of product being consumed from the reservoir;

retrieving from the server data corresponding to a fulfillment time of the type of product; and adjusting the threshold amount based on the retrieved data corresponding to the fulfillment time.

10. The consumable item container of claim 1, wherein, after transmitting the second measurement of the amount of the consumable item in the reservoir measured with the sensor to the server through the network, the computer-readable instructions further dynamically determine the threshold amount of the consumable item contained in the reservoir by:

receiving a third measurement of the amount of the consumable item in the reservoir with the sensor;

adjusting the threshold amount of the consumable item based on the third measurement; and retrieving updated data corresponding to the fulfillment time in response to receiving the third measurement.

11. A method of dynamically adjusting a threshold of a consumable item within a container, the method comprising:

receiving, on a server, a first measurement of an amount of a consumable item in a reservoir of a consumable item container from a sensor in sensory contact with the reservoir;

storing the first measurement of the amount of a consumable item in the reservoir;

receiving, on the server, a second measurement of the amount of the consumable item in the reservoir of the consumable item container from the sensor in sensory contact with the reservoir;

generating a threshold amount of the consumable item based on the received first measurement and the received second measurement of the amount of the consumable item in the reservoir;

receiving a third measurement of the amount of the consumable item in the reservoir of the consumable item container from the sensor in sensory contact with the reservoir;

adjusting the threshold amount of the consumable item based on the received third measurement of the amount of the consumable item in the reservoir;

determining an estimated fulfillment time for the consumable item based on shipping time to a location of the container and average daily fulfillment rate;

calculating the threshold amount based on the estimated fulfillment time and a consumption rate determined from the first measurement and the second measurement;

continuously updating the threshold amount based on data received on the server corresponding to fulfillment time and availability of the consumable item;

periodically evaluating with the sensor an amount of the consumable product in the reservoir relative to the continuously updated threshold amount; and updating the threshold amount based on consumption during each evaluation period and availability of the product from the server.

12. The method of dynamically adjusting a threshold of a consumable item within a container of claim 11, wherein determining an estimated fulfillment time is based on data corresponding to a shipping time to a location of the consumable item container, data corresponding to an average daily fulfillment rate, calendar data identifying any holidays or non-shipping days, and an inventory level of the type of product being consumed from the reservoir of the consumable item container.

13. The method of dynamically adjusting a threshold of a consumable item within a container of claim 12, further comprising retrieving the data corresponding to the fulfillment time for the consumable item in response to receiving each of the first, second, and third measurements of the amount of the consumable item in a reservoir of the consumable item container.

14. The method of dynamically adjusting a threshold of a consumable item within a container of claim 13, further comprising adjusting the threshold amount of the consumable item in response to receiving each of the first, second, and third measurements of the amount of the consumable item in a reservoir of the consumable item container.

15. The method of dynamically adjusting a threshold of a consumable item within a container of claim 12, wherein the data corresponding to a fulfillment time for the consumable item further comprises a fulfillment buffer time.

16. The method of dynamically adjusting a threshold of a consumable item within a container of claim 11, further comprising:

determining with a processor of the server that an amount of the consumable item within the reservoir of the container is at or below the threshold amount:

in response to determining that an amount of the consumable item within the reservoir of the container is at or below the threshold amount, transmit an order for fulfillment of the consumable item to the location of the container.

17. The method of dynamically adjusting a threshold of a consumable item within a container of claim 16, further comprising transmitting a notice to a user device that an order for fulfillment of the consumable item has been placed.

18. A method of dynamically adjusting a threshold of a consumable item within a container, the method comprising:

receiving, on a server, a first measurement of an amount of a consumable item in a reservoir of a consumable item container from a sensor in sensory contact with the reservoir;

storing the first measurement of the amount of a consumable item in the reservoir;

receiving, on the server, data identifying a type of product being consumed from the reservoir of the consumable item container;

receiving, on the server, a second measurement of the amount of the consumable item in the reservoir of the consumable item container from the sensor in sensory contact with the reservoir;

generating a threshold amount of the consumable item based on the received first measurement and the received second measurement of the amount of the consumable item in the reservoir;

receiving a third measurement of the amount of the consumable item in the reservoir of the consumable item container from the sensor in sensory contact with the reservoir; and adjusting the threshold amount of the consumable item based on the received third measurement of the amount of the consumable item in the reservoir;

determining an estimated fulfillment time for the consumable item based on shipping time to a location of the container and average daily fulfillment rate;

calculating the threshold amount based on the estimated fulfillment time and a consumption rate determined from the first measurement and the second measurement;

continuously updating the threshold amount based on data received on the server corresponding to fulfillment time and availability of the consumable item;

periodically evaluating with the sensor an amount of the consumable product in the reservoir relative to the continuously updated threshold amount; and updating the threshold amount based on consumption during each evaluation period and availability of the product from the server.

* * * * *